US012619791B2

(12) United States Patent
Hulton et al.

(10) Patent No.: US 12,619,791 B2
(45) Date of Patent: May 5, 2026

(54) ENCRYPTED KEY MANAGEMENT

(71) Applicant: MICRON TECHNOLOGY, INC.,
Boise, ID (US)

(72) Inventors: David Hulton, Seattle, WA (US);
Jeremy Chritz, Seattle, WA (US)

(73) Assignee: Micron Technology, Inc., Boise, ID
(US)

( * ) Notice: Subject to any disclaimer, the term of this
patent is extended or adjusted under 35
U.S.C. 154(b) by 770 days.

(21) Appl. No.: 17/146,274

(22) Filed: Jan. 11, 2021

(65) Prior Publication Data
US 2022/0222384 A1     Jul. 14, 2022

(51) Int. Cl.
G06F 12/02        (2006.01)
G06F 12/14        (2006.01)
(Continued)

(52) U.S. Cl.
CPC .......... G06F 21/79 (2013.01); G06F 12/0246
(2013.01); G06F 13/1668 (2013.01);
(Continued)

(58) Field of Classification Search
CPC .. G06F 21/79; G06F 12/0246; G06F 13/1668;
G06F 13/4068; G06F 13/4221;
(Continued)

(56) References Cited

U.S. PATENT DOCUMENTS 5,457,748 A * 10/1995 Bergum ................ H04L 9/0894
380/270
7,814,316 B1 * 10/2010 Hughes ................... G06F 21/72
713/160

(Continued)

FOREIGN PATENT DOCUMENTS

CN        109255231 A    1/2019
EP          3716071 A1    9/2020
(Continued)

OTHER PUBLICATIONS

U.S. Appl. No. 18/146,120, filed Dec. 23, 2022 titled, "Memory
Systems and Devices Including Examples of Accessing Memory
Andgenerating Access Codes Using an Authenticated Stream Cipher,";
pp. all pages of application as filed.

(Continued)

*Primary Examiner* — Andrew Suh

(74) *Attorney, Agent, or Firm* — Dorsey & Whitney LLP

(57)        ABSTRACT

Examples of systems and methods described herein provide
for erasing an encrypted key used for data access to a
non-volatile memory device. A memory controller may
generate an encrypted key for data access to non-volatile
memory devices; and, to provide security of data stored on
the non-volatile memory devices, the memory controller
may store the encrypted key in a local cache of the memory
controller. The encrypted key may be erased responsive to
losing power or powering down of memory controller.
Advantageously, the data stored at the non-volatile memory
device may not be accessed when the memory controller (or
a computing device implementing the memory controller)
loses power. Accordingly, if a malicious actor were to
physically remove (or steal) a computing device implement-
ing the memory controller (e.g., a laptop computer), in an
attempt to acquire the data, the data stored on the non-
volatile memory devices could not be accessed.

25 Claims, 4 Drawing Sheets

<div style="display: flex">
<div>

(51) Int. Cl.

| | |
|---|---|
| *G06F 13/16* | (2006.01) |
| *G06F 13/40* | (2006.01) |
| *G06F 13/42* | (2006.01) |
| *G06F 21/10* | (2013.01) |
| *G06F 21/60* | (2013.01) |
| *G06F 21/62* | (2013.01) |
| *G06F 21/79* | (2013.01) |
| *G11C 7/20* | (2006.01) |
| *G11C 14/00* | (2006.01) |

(52) U.S. Cl.
CPC ...... *G06F 13/4068* (2013.01); *G06F 13/4221* (2013.01); *G06F 21/602* (2013.01); *G06F 21/107* (2023.08)

(58) Field of Classification Search
CPC .. G06F 21/602; G06F 21/107; G06F 12/0238; G06F 12/1408; G06F 2212/1052; G06F 2212/214; G06F 2212/312; G06F 2212/402; G06F 2212/466; G06F 2212/7203; G06F 21/6218; G11C 7/20; G11C 14/0018; G11C 14/0063
See application file for complete search history.

(56) References Cited

U.S. PATENT DOCUMENTS

| | | | | | |
|---|---|---|---|---|---|
| 8,674,823 | B1 * | 3/2014 | Contario | .............. | G01R 19/145 |
| | | | | | 340/693.1 |
| 8,938,624 | B2 * | 1/2015 | Obukhov | ............ | G06F 21/6209 |
| | | | | | 713/193 |
| 9,954,828 | B1 * | 4/2018 | Chandrasekhar | ..... | H04L 9/0894 |
| 10,175,118 | B1 * | 1/2019 | Rezayee | .................. | G01K 7/16 |
| 10,733,291 | B1 * | 8/2020 | McLeod | ............ | G06F 11/3058 |
| 10,809,944 | B1 | 10/2020 | Ostrikov et al. | | |
| 10,929,572 | B2 * | 2/2021 | Wu | ........................ | H04L 9/0897 |
| 11,409,918 | B1 * | 8/2022 | Sugavanam | ............ | G06F 21/64 |
| 11,537,298 | B2 | 12/2022 | Chritz et al. | | |
| 11,899,829 | B2 | 2/2024 | Chritz et al. | | |
| 11,899,942 | B2 | 2/2024 | Chritz et al. | | |
| 12,321,616 | B2 | 6/2025 | Chritz et al. | | |
| 2005/0076228 | A1 * | 4/2005 | Davis | ...................... | G06F 21/73 |
| | | | | | 713/188 |
| 2010/0005317 | A1 | 1/2010 | Pribadi et al. | | |
| 2011/0082979 | A1 * | 4/2011 | Ramesh | ................ | H04L 9/0863 |
| | | | | | 713/193 |
| 2011/0154043 | A1 | 6/2011 | Lim et al. | | |
| 2011/0205016 | A1 | 8/2011 | Al-azen et al. | | |

</div>
<div>

| | | | | | |
|---|---|---|---|---|---|
| 2015/0058637 | A1 * | 2/2015 | Raskin | .................... | G06F 21/85 |
| | | | | | 713/189 |
| 2016/0018996 | A1 | 1/2016 | Doumen | | |
| 2016/0078252 | A1 | 3/2016 | Chandra et al. | | |
| 2016/0098359 | A1 | 4/2016 | Adkins et al. | | |
| 2016/0204931 | A1 | 7/2016 | Kamath et al. | | |
| 2018/0095675 | A1 | 4/2018 | Kachare et al. | | |
| 2018/0181499 | A1 | 6/2018 | Branco et al. | | |
| 2018/0307848 | A1 * | 10/2018 | Leiseboer | .............. | G06F 21/78 |
| 2018/0349293 | A1 | 12/2018 | Lin | | |
| 2018/0373598 | A1 | 12/2018 | Mondello et al. | | |
| 2019/0050347 | A1 | 2/2019 | Bolotov et al. | | |
| 2019/0056999 | A1 * | 2/2019 | Foxworth | ................ | G11C 7/20 |
| 2019/0243714 | A1 * | 8/2019 | Foxworth | ............. | G11C 5/148 |
| 2020/0226270 | A1 | 7/2020 | Benedict | | |
| 2020/0364159 | A1 | 11/2020 | Lee et al. | | |
| 2021/0240862 | A1 | 8/2021 | Pelissier et al. | | |
| 2021/0328790 | A1 * | 10/2021 | Eckel | .................... | H04L 9/0869 |
| 2021/0377017 | A1 * | 12/2021 | Benisty | ................ | G06F 21/602 |
| 2022/0050741 | A1 | 2/2022 | Lee | | |
| 2022/0171545 | A1 | 6/2022 | Chritz et al. | | |
| 2022/0171887 | A1 | 6/2022 | Chritz et al. | | |
| 2023/0126741 | A1 | 4/2023 | Chritz et al. | | |
| 2024/0176916 | A1 | 5/2024 | Chritz et al. | | |
| 2024/0201871 | A1 | 6/2024 | Chritz et al. | | |
| 2025/0225236 | A1 | 7/2025 | Chritz et al. | | |

FOREIGN PATENT DOCUMENTS

| | | | |
|---|---|---|---|
| JP | 2009245020 | A * | 10/2009 |
| JP | 2012168737 | A | 9/2012 |
| WO | 2022119819 | A1 | 6/2022 |
| WO | 2022119822 | A1 | 6/2022 |

OTHER PUBLICATIONS

U.S. Appl. No. 17/108,904, titled "Memory Systems and Devices Including Examples of Accessing Memory and Generating Access Codes Using an Authenticated Stream Cipher", dated Dec. 1, 202.

U.S. Appl. No. 17/108,934, titled "Memory Systems and Devices Including Examples of Generating Access Codes for Memory Regions Using Authentication Logic", dated Dec. 1, 2020.

U.S. Appl. No. 18/428,157 titled "Memory Systems and Devices Including Examples of Accessing Memory and Generating Access Codes Using an Authenticated Stream Cipher", filed Jan. 31, 2024; pp. all pages of application as filed.

U.S. Appl. No. 19/205,070 titled "Memory Systems and Devices Including Examples of Accessing Memory and Generating Access Codes Using an Authenticated Stream Cipher", filed May 12, 2025; pp. all pages of application as filed.

\* cited by examiner

</div>
</div>

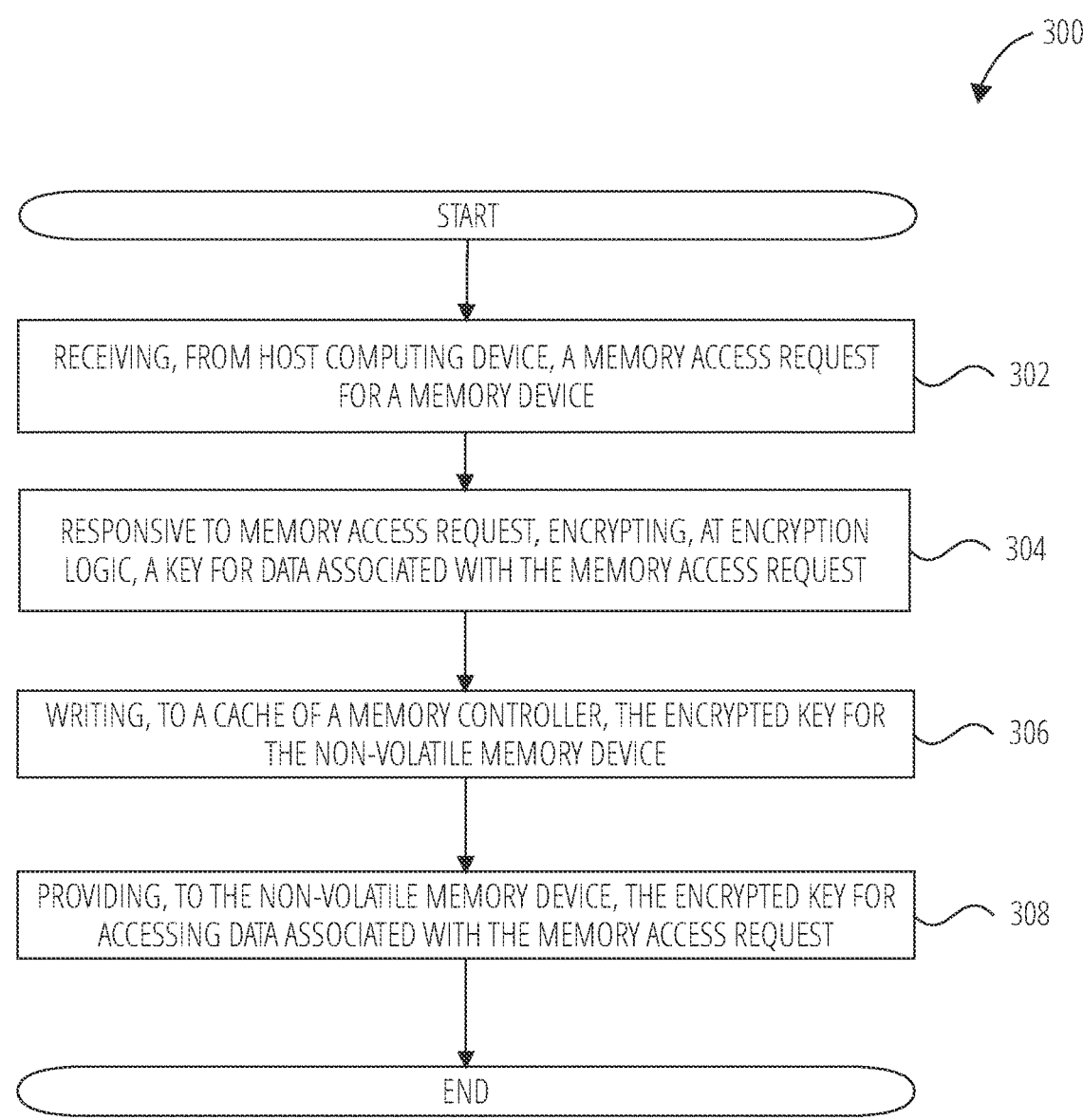

300

START

RECEIVING, FROM HOST COMPUTING DEVICE, A MEMORY ACCESS REQUEST FOR A MEMORY DEVICE    302

RESPONSIVE TO MEMORY ACCESS REQUEST, ENCRYPTING, AT ENCRYPTION LOGIC, A KEY FOR DATA ASSOCIATED WITH THE MEMORY ACCESS REQUEST    304

WRITING, TO A CACHE OF A MEMORY CONTROLLER, THE ENCRYPTED KEY FOR THE NON-VOLATILE MEMORY DEVICE    306

PROVIDING, TO THE NON-VOLATILE MEMORY DEVICE, THE ENCRYPTED KEY FOR ACCESSING DATA ASSOCIATED WITH THE MEMORY ACCESS REQUEST    308

END

FIG. 3

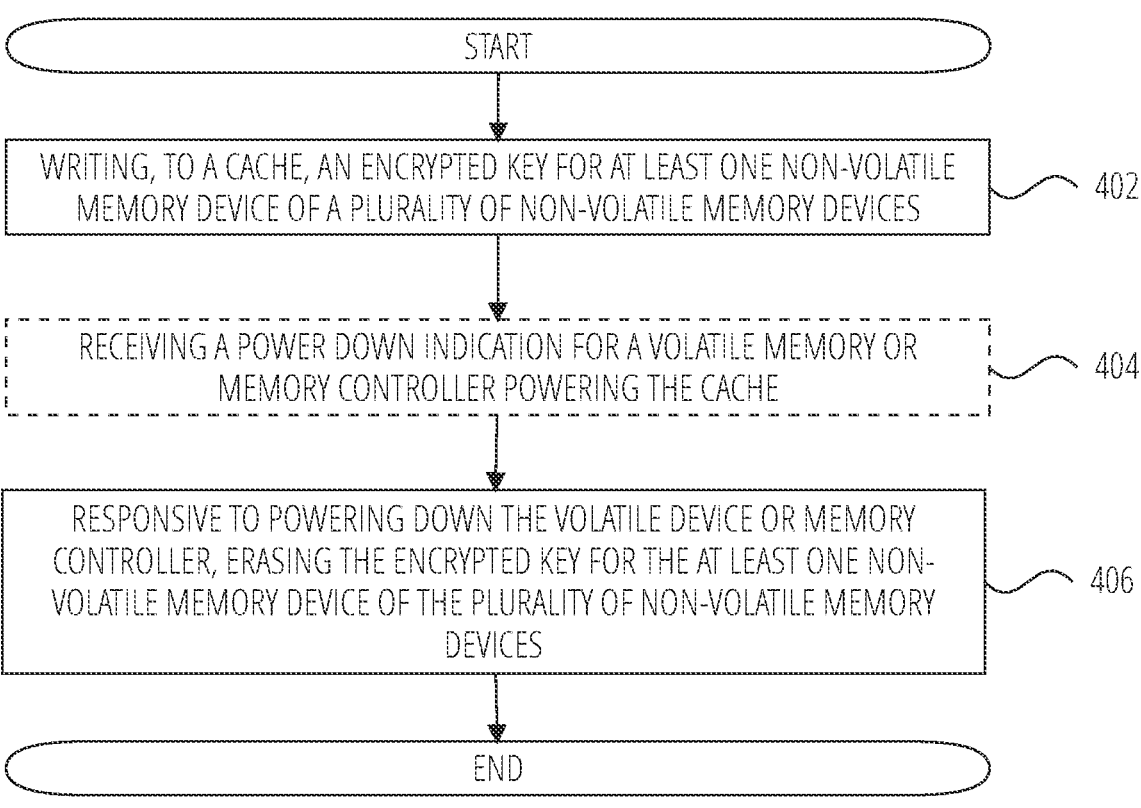

START

WRITING, TO A CACHE, AN ENCRYPTED KEY FOR AT LEAST ONE NON-VOLATILE MEMORY DEVICE OF A PLURALITY OF NON-VOLATILE MEMORY DEVICES — 402

RECEIVING A POWER DOWN INDICATION FOR A VOLATILE MEMORY OR MEMORY CONTROLLER POWERING THE CACHE — 404

RESPONSIVE TO POWERING DOWN THE VOLATILE DEVICE OR MEMORY CONTROLLER, ERASING THE ENCRYPTED KEY FOR THE AT LEAST ONE NON-VOLATILE MEMORY DEVICE OF THE PLURALITY OF NON-VOLATILE MEMORY DEVICES — 406

END

FIG. 4

ENCRYPTED KEY MANAGEMENT

TECHNICAL FIELD

Embodiments of the disclosure relate generally to memory, and more particularly, in one or more of the illustrated embodiments, to erasing an encrypted key used for data access to a non-volatile memory device.

BACKGROUND

Emerging memory architectures are designed to handle a range of memory access requests and may include memories with different characteristics. For example, memory may include dynamic random-access memory (DRAM) and phase-change memory (PCM)). Non-volatile memories may be highly non-uniform. For example, certain NAND flash memories (e.g., based on page type) may be faster to read or write than others, with latencies changing as they wear out, or with different levels of cell (e.g., multi-level-cells (MLC)), among different NAND flash memories. Emerging memory architectures may also utilize non-volatile dual in-line memory modules (NVDIMMs), such as NVDIMM-P or NVDIMM/M-F. NVDIMMs generally include both a non-volatile and a volatile memory device. Non-volatile memory generally retains its contents even when power is temporarily or permanently removed, such as NAND memory. Volatile memory generally would lose its contents when power is permanently, or in some cases temporarily, removed from the device. However, volatile memory may have some improved characteristics over non-volatile memory (e.g., volatile memory may be faster).

BRIEF DESCRIPTION OF THE DRAWINGS

FIG. 3 is a schematic illustration of a method in accordance with examples described herein.

FIG. 4 is a schematic illustration of a method in accordance with examples described herein.

DETAILED DESCRIPTION

Figure 1:
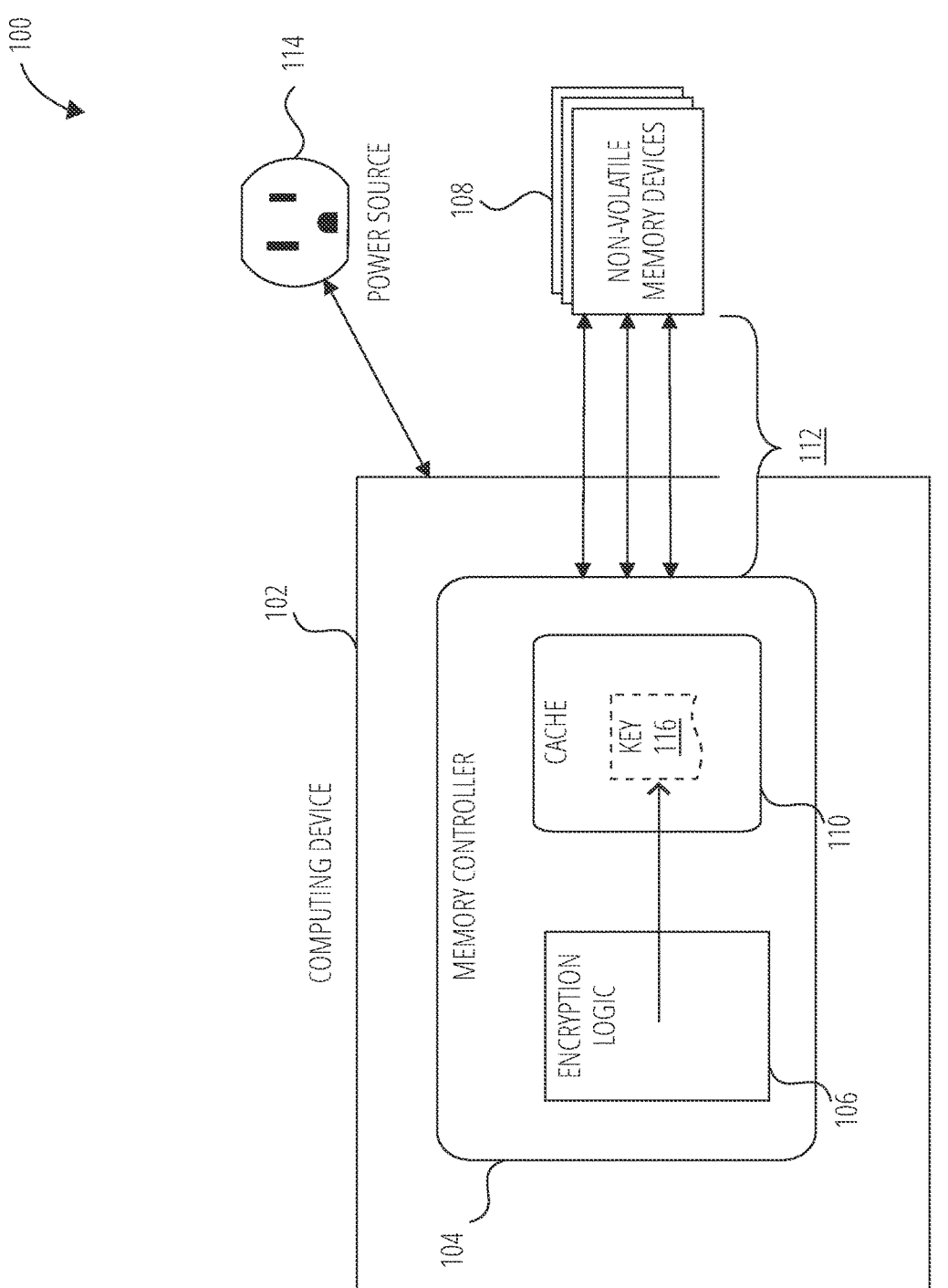
FIG. 1 is a schematic illustration of a memory system interacting in accordance with examples described herein.

Cryptographic methods may use block ciphers to provide security for data, e.g., to authenticate data using a cryptographic key. For example, a cryptographic key may transform data from plaintext to ciphertext when encrypting; and vice-versa when decrypting. A block cipher provides a block transformation of information bits to encrypt (or conversely, to decrypt) data. For example, the Advanced Encryption Standard (AES) is a type of block cipher. Additionally, a block cipher may operate in different modes within a cryptographic device/method, e.g., as a "stream cipher" in which a counter is used. For example, the counter may be used as a basis to alter the underlying cryptographic key used by the block cipher, such that the cryptographic key changes over time; to, in turn, alter data in an encrypted stream of data. For example, Galois/Counter Mode (GCM) is a type of stream cipher.

It may be complex and cumbersome to secure NVDIMM devices.

Examples of systems and methods described herein provide for erasing an encrypted key used for data access to a non-volatile memory device. Computing devices that regularly access memory devices may do so through a memory controller. For example, a host computing device may generate memory access requests which are routed through a memory controller that controls access to various coupled memory devices, which may be non-volatile memory devices. Generally, a memory access request can be or include a command and an address, for example, a memory command and a memory address. In various implementations, the memory access request may be or include a command and an address for a read operation, a write operation, an activate operation, or a refresh operation at coupled non-volatile memory devices. Generally, a received command and address may facilitate the performance of memory access operations at coupled memory devices, such as read operations, write operations, activate operations, and/or refresh operations for the coupled memory devices.

Using the systems and methods described herein, a memory controller may generate an encrypted key that may be used to access data stored in one or more non-volatile memory devices. For example, the encrypted key may be written to a cache coupled to a volatile memory device or a cache that is a volatile memory device. To provide security of data stored on the non-volatile memory devices, the memory controller may store the encrypted key in a local cache of the memory controller. For example, the local cache at the memory controller may be a volatile memory device. In the example, because the encrypted key is stored in a volatile memory device of the memory controller, the encrypted key is erased when the memory controller loses electrical connection to a power source or is powered down. For example, the encrypted key may be erased responsive to the powering down (e.g., a power down indication received), or by virtue of the volatile memory device having lost power. Accordingly, the data stored at the non-volatile memory device may not be accessed when the memory controller (or a computing device implementing the memory controller) loses power.

In some memory system implementations, data stored on non-volatile memory devices may provide additional security in use cases where the data is accessed only when the memory controller is powered. For example, if a malicious actor were to physically remove (e.g., steal) a computing device including the memory controller (e.g., a laptop computer), the encrypted key to access the data stored on the non-volatile memory devices of the computing device would be erased from a cache of the memory controller when the memory controller loses power or the computing device loses power. In the example, once the memory controller loses an electrical connection to a power source, the encrypted key is erased from the cache that had stored the encrypted key. Accordingly, without the encrypted key, the data stored on the non-volatile memory devices could not be accessed. Therefore, advantageously, example systems and methods described herein provide security for data stored on non-volatile memory devices accessed by a memory controller. In some examples, the non-volatile memory devices may be NAND memories implemented as NVDIMMs, interacting with the memory controller in accordance with an NVDIMM protocol, such as NVDIMM-P or NVDIMM-F.

Generally, a memory controller provides access to data stored on non-volatile memory devices. In examples described herein, the memory controller may use an encrypted key to provide authenticated access to data stored on non-volatile memory devices. In some implementations, the encrypted key may be specifically generated for data that is to be accessed stored on non-volatile memory devices. For example, the memory controller may generate an encrypted key for data associated with a received memory access request. Based on that memory access request, data read or written by a host computing device to various non-volatile memory devices may be accessed in an authenticated manner, e.g., using the generated encrypted key. For example, a provisioned key may be encrypted according to an AES cipher, e.g., encrypted as a cryptographic key. The authentication logic of a memory controller may utilize a pseudorandom value from a pseudorandom value generator and a provisioned key (e.g., a Disk Encryption Key (DEK)) to generate the encrypted key, e.g., a cryptographic key. In an example implementation of an AES cipher, the pseudorandom value may be used as an initialization vector (IV) for the AES cipher. As described herein, the generated encrypted key may be referred to, for simplicity, as the key for the non-volatile memory device(s). Advantageously, the key may provide security for the specific data accessed by the memory controller to that non-volatile memory device. For example, the data accessed (e.g., read or written) may be encrypted or decrypted (e.g., as plaintext or ciphertext) using the key.

FIG. 1 is a schematic illustration of a system 100 arranged in accordance with examples described herein. System 100 includes a computing device 102 including a memory controller 104, which may control one or more non-volatile memory devices 108. Memory controller 104 includes encryption logic 106, which may be implemented using a processor (e.g., examples of which are described with reference to FIG. 2), and a cache 110. The cache 110 may be implemented using a volatile memory device. The memory controller 104 is coupled to non-volatile memory devices 108 via respective memory buses 112. In operation, the encryption logic 106 may generate a key 116 that may be encrypted and may be used to access data on the non-volatile memory devices 108. For example, the key 116 may be used by the memory controller 104 to authenticate access to the non-volatile memory devices 108. The encryption logic 106 may store the key 116 in the cache 110. The computing device 102 may be electrically connected to a power source 114, which powers the computing device 102. In turn, the memory controller 104 may also be powered by the power source 114. When the power source 114 is electrically disconnected from the computing device 102, the computing device 102 loses power and thus the memory controller 104 also loses power, causing the key 116 to be erased from the cache 110. Advantageously, in writing the key 116 in the cache 110, which may be a volatile memory device, the cache 110 erases data or loses data upon electrical disconnection from the power source 114.

Any of a variety of power sources may be used to implement power source 114, wired and wireless. For example, AC power may be used (e.g., from a standard wall outlet). DC power may be used in some examples (e.g., from one or more batteries). In some example, energy harvesting circuitry may be provided and used as a power source. Magnetic, induction, or other wireless power devices may also be provided in some examples.

In some examples, when the power source 114 is electrically disconnected from the computing device 102, the computing device 102 loses power, and the memory controller 104 loses power in accordance with a comparison of threshold operating voltage, e.g., to detect whether the memory controller 104 has lost power. For example, the memory controller 104 loses power when the memory controller 104 passes below a threshold operating voltage for the memory controller 104. In an example of the memory controller 104 being implemented as part of a printed circuit board, if the threshold operating voltage is a 5V printed circuit board voltage, the memory controller 104 may lose power when the 5V voltage is no longer supplied to the memory controller 104 because the computing device 102 uses the power source 114 to maintain that 5V printed circuit board voltage at the memory controller 104. Accordingly, the memory controller 104 loses power because the power supplied to the memory controller 104 passes below the 5V voltage, causing the key 116 to be erased from the cache 110.

Additionally or alternatively, in using a threshold operating voltage for the memory controller 104 to detect whether the memory controller 104 has lost power, the memory controller 104 may include a timer circuit (not depicted in FIG. 1). The timer circuit may receive a clock signal from the printed circuit board that is separately powered by a battery coupled to the printed circuit board. The timer circuit may be used by the memory controller 104 to measure an amount of time that has passed after the memory controller 104 has lost power. In some examples, the memory controller 104 may compare an amount of time that has passed since losing power, as measured by a timing circuit, with a threshold amount of time. If, based on the comparison of the amount of time and the threshold of time, the amount of time is less than the threshold amount of time, the memory controller 104 will not erase the key 116 is from the cache 110, e.g., the memory controller 104 will maintain a battery connection to the cache 110 (e.g., a battery coupled to the printed circuit board that the memory controller 104 is implemented upon), while the amount of time is measured by the timer circuit and the memory controller 104 performs the comparison.

The threshold amount of time may correspond to a power loss event, such as a power-line flicker, where power to the computing device 102 is lost for an amount of time less than the threshold amount of time. The threshold amount of time may be stored in a memory or a cache (e.g., cache 110). The threshold amount of time may be a parameter set by a user of the computing device 102 or may be based on a flicker metric, such as a power flicker metric defined by the IEEE 1453 standard and/or IEC 61000-4-15. Accordingly, when the power source 114 is electrically disconnected from the computing device 102, the memory controller 104 may use an amount of time, as measured by a timer circuit and a threshold operating voltage, to detect whether the memory controller 104 has lost power. If the amount of time measured passes the threshold amount of time and the operating voltage passes a threshold operating voltage, then memory controller 104 will have detected that a power source 114 has been disconnected, causing the key 116 to be erased from the cache 110. In examples where the memory controller 104 maintains a battery connection to the cache 110, the memory controller 104 will disconnect and/or decouple the battery connection to the cache 110, such that the cache 110 loses a power supply or operating voltage.

The non-volatile memory devices 108 may store data retrieved by and/or for access by the computing device 102. As some examples, the computing device 102 may be a server at a data center or a laptop at a data center, and the computing device 102 may process datasets (e.g., image or content datasets) for use by one or more neural networks hosted on computing device 102. A dataset may be stored in one or more of the non-volatile memory devices 108 (e.g., the dataset may be distributed among the non-volatile memory devices 108). In some implementations, the dataset may include personally identifiable information (PII) such that an operator of the server may desire security for the data stored on the non-volatile memory devices 108. For example, if a malicious actor were to physically remove (or steal) the computing device 102 including the memory controller 104, in an attempt to acquire the PII data stored on the non-volatile memory devices 108, the encrypted key 116 to access the data stored on the non-volatile memory devices 108 would be erased from the cache 110 of the memory controller 104 when the memory controller 104 loses power or the computing device 102 implementing the memory controller 104 loses power. In the example, when the computing device 102 is unplugged or electrically disconnected from the power source 114, the key 116 is erased from the cache 110; thereby making it difficult for the malicious actor to access the data stored on the non-volatile memory devices 108. For example, the malicious actor could not simply turn on the laptop to the access the data stored on the non-volatile memory devices 108 because the key 116 was erased from the cache 110. Advantageously, the system 100 provides security for data, like the example of PII data, stored on non-volatile memory devices 108 coupled to a memory controller 104. While PII has been provided as an example of data for which security may be desired, any data may be protected in accordance with examples described herein including proprietary data, sensitive data, or confidential data.

In other example implementations of the computing device 102 as a server at a data center, a data center operator may reset or disconnect power source 114 to provide an initial state or reset the computing device 102 operating as a server, e.g., the computing device 102 may be reset to provide security updates to the computing device 102 or to facilitate access to the computing device 102 for a new user (e.g., a customer of the data center) accessing the computing device 102. For example, in some data centers, multiple users (or tenants) may access a single computing device 102 to store data on non-volatile memory devices 108. This may be referred to as a multi-tenant use case of the computing device 102. To prevent inadvertent or unauthorized access to particular regions of memory in one of the non-volatile memory devices 108 or one or more non-volatile memory devices 108, a key 116 may be generated by the encryption logic 106 for particular memory access requests of certain users to access data on at least one of the non-volatile memory devices 108, or, at least a particular region of memory of the one of the non-volatile memory devices 108. Accordingly, the key 116 of a particular user may be used only by that user (e.g., tenant) to access data stored on the non-volatile memory devices 108. Advantageously, the system 100 may provide security for data of individual users of the computing device 102, in such a multi-tenant use case, to prevent unauthorized access or inadvertent access to data of another user. In the example, when the computing device 102 is reset or disconnected from power source 114, the computing device 102 does not facilitate access to particular data stored by a particular user because the key 116 for that particular user to access the non-volatile memory devices 108 is erased from the cache 110.

The memory controller 104 may be an M memory controller implemented in the computing device 102. For example, the computing device 102 may be a host computing device that is coupled to the memory controller 104 via a host bus (not depicted). In the example of an NVDIMM memory controller, the host bus may operate in accordance with an NVDIMM protocol, such as NVDIMM-F, NVDIMM-N, NVDIMM-P, or NVDIMM-X. In such implementations, the non-volatile memory devices 108 may be NAND memory devices or 3D XPoint memory devices.

Accordingly, the non-volatile memory devices 108 may also operate as persistent storage for the cache 110, which may be a volatile memory device and/or operate as persistent storage for any volatile memory on the memory controller 104 or the computing device 102. Generally, volatile memory may have some improved characteristics over non-volatile memory (e.g., volatile memory may be faster). The non-volatile memory devices 108 may also include one or more types of memory, including but not limited to: DRAM, SRAM, triple-level cell (TLC) NAND, single-level cell (SLC) NAND, SSD, or 3D XPoint memory devices. Data stored in or data to be accessed from the non-volatile memory devices 108 may be communicated via the memory buses 112 from the memory controller 104. For example, the memory buses 112 may be PCIe buses.

Computing devices described herein, such as computing device 102 shown in FIG. 1, may be implemented using generally any computing device 102 device for which a computing capability using non-volatile memory devices is desired. For example, computing device 102 may be implemented using a smartphone, smartwatch, computer (e.g., a server, laptop, tablet, desktop), a wearable computing device, a vehicle, an appliance, or an Internet-of-Things (IoT) computing device. While not explicitly shown in FIG. 1, computing device 102 may include any of a variety of components in some examples, including, but not limited to, memory, input/output devices, circuitry, processing units (e.g. processing elements and/or processors), or combinations thereof.

Figure 2:
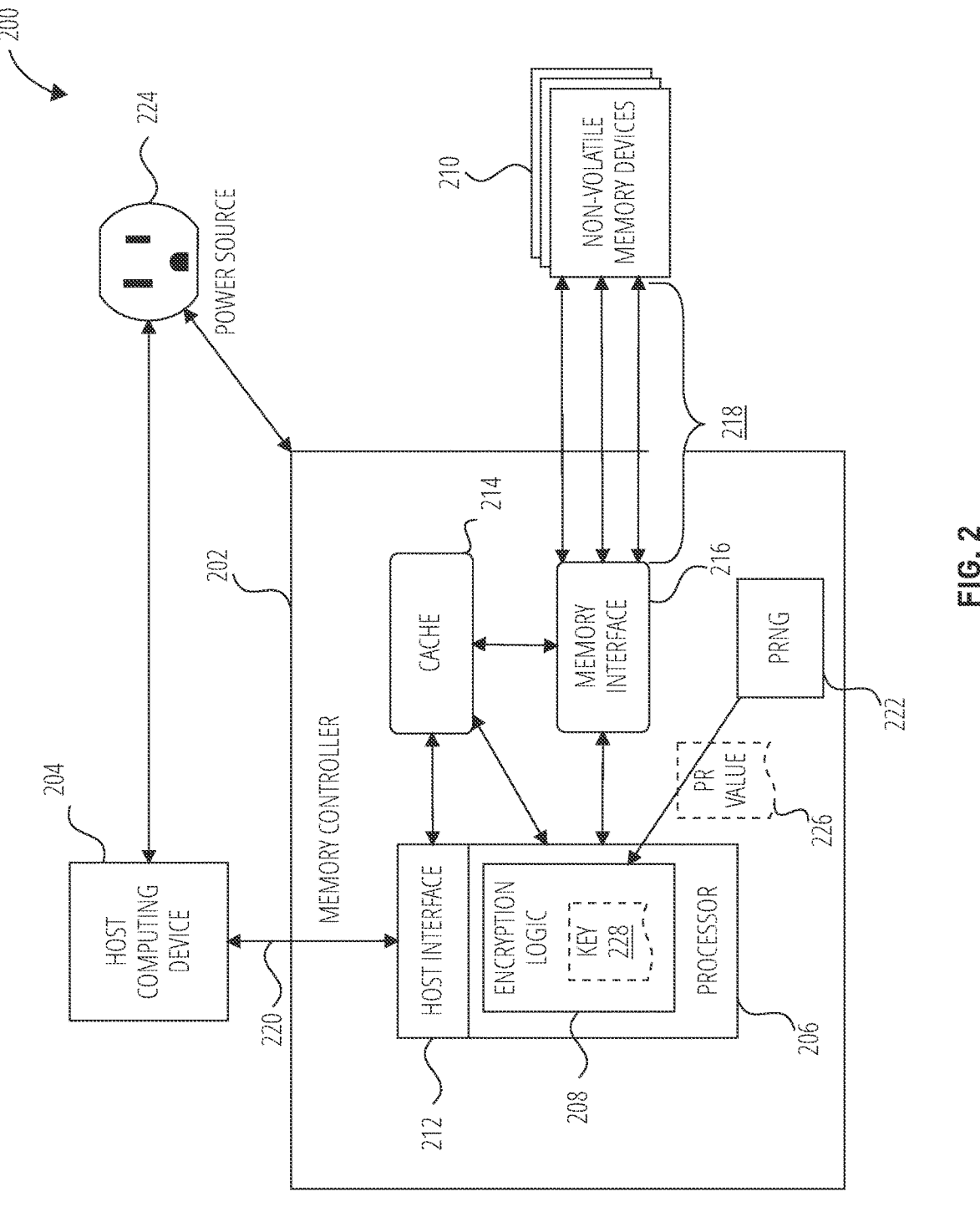
FIG. 2 is a schematic illustration of a memory system interacting in accordance with examples described herein.

FIG. 2 is a schematic illustration of a memory system 200 arranged in accordance with examples described herein. In FIG. 2, similarly-named elements may have analogous operation or function as described with respect to FIG. 1. For example, encryption logic 208 may operate as described with respect to encryption logic 106 of FIG. 1. In some examples, non-volatile memory devices 210 may operate as described with respect to non-volatile memory devices 108 of FIG. 1. Memory system 200 includes a host computing device 204 coupled to memory controller 202, which may control one or more non-volatile memory devices 210. In some examples, the memory controller 202 is embodied in or is an element of the host computing device 204. In such cases, the host computing device 204 may be an SOC, CPU, GPU, FPGA, or the like, and the memory controller 202 may be logic, circuitry, or a component of such SOC, CPU, GPU, or FPGA. In some examples, the host computing device 204 is one physical device and the memory controller 202 is a separate physical device (e.g., each may be chiplets in a system of chiplets). In some cases, memory controller 202 and non-volatile memory devices 210 are elements of a module (e.g., a DIMM, card, or drive) and the host computing device 204 is a separate processor.

Memory controller 202 may include a host interface 212 which may couple to a host bus 220 for connection to the host computing device 204. The host interface 212 is coupled to processor 206 or processing resource, which may be an SOC, ASIC, FPGA, or the like, and may be separate from or an element of host computing device 204 (as described above). The processor 206 may include encryption logic 208. The host interface 212 and the processor 206 may also be coupled to the cache 214 via internal memory controller buses, for example. The processor 206 is coupled to non-volatile memory devices 210 via memory interface 216 and respective memory buses 218. The memory interface 216 is also coupled to the cache 214, e.g., also via an internal memory controller bus. Memory controller 202 also includes a pseudorandom number generator (PING) 222 that generates pseudorandom value 226 and provides pseudorandom value 226 to the encryption logic 208.

In example implementations, the processor 206 may include any type of microprocessor, central processing unit (CPU), ASIC, digital signal processor (DSP) implemented as part of a field-programmable gate array (FPGA), a system-on-chip (SoC), or other hardware. For example, the processor 206 may be implemented using discrete components such as an application specific integrated circuit (ASIC) or other circuitry, or the components may reflect functionality provided by circuitry within the memory controller 202 that does not necessarily have a discrete physical form separate from other portions of the memory controller 202. Portions of the processor 206 may be implemented by combinations of discrete components. For example, the encryption logic 208 may be implemented as an ASIC, while other processor functionalities (e.g., memory access request processing/queuing) may be implemented as an FPGA with various stages in a specified configuration. Although illustrated as a component within the memory controller 202 in FIG. 2, the processor 206 may be external to the memory controller 202 or have a number of components located within the memory controller 202 and a number of components located external to the memory controller 202.

The non-volatile memory devices 210 may store and provide information (e.g., data and instructions) responsive to memory access requests received from the memory controller 202, e.g., memory access requests routed or processed by processor 206 from host computing device 204. In operation, the non-volatile memory devices 210 may process memory access requests to store and/or retrieve information based on memory access requests. For example, the host computing device 204 may include a host processor which may execute a user application requesting stored data and/or stored instructions at non-volatile memory devices 210 (and/or to store data/instructions). When executed, the user application may generate a memory access request to access data or instructions in the non-volatile memory devices 210. Generally, as described above, a memory access request can be or include a command and an address, for example, a memory command and a memory address. In various implementations, the memory access request may be or include a command and an address for a read operation, a write operation, an activate operation, or a refresh operation at non-volatile memory devices 210. Generally, a received command and address may facilitate the performance of memory access operations at non-volatile memory devices 210, such as read operations, write operations, activate operations, and/or refresh operations for non-volatile memory devices 210. Accordingly, the memory access request may be or include a memory address(s) for one or more of the non-volatile memory devices 210. In an example of a write operation, the memory access request may also include data, e.g., in addition to the command and the address. The memory access requests from the host computing device 204 are provided to the processor 206 via the host bus 220 and host interface 212. For example, the host bus 220 may be a PCIe bus, and the host interface 212 may be a PCIe interface for the processor 206.

Advantageously, the memory system 200, in receiving memory access requests at the memory controller 202, facilitates the generation of encrypted keys, like key 228, to access data stored accessed on the non-volatile memory devices 210. For example, in receiving a memory access request at processor 206, the processor 206 may provide an encryption indication to the encryption logic 208 such that an encrypted key 228 is generated for that particular memory access request. For example, the encryption logic 208, upon receiving the encryption indication, may identify a memory address in the received memory access request that corresponds to a memory address of at least one of the non-volatile memory devices 210. Once identified, the encryption logic 208 may generate an encrypted key 228 for data associated with that memory access request. In the example of the write operation, the encrypted key 228 may be generated to secure the data written to the memory address at that non-volatile memory device of the non-volatile memory devices 210. The written data may be accessed only if the encrypted key 228 is used to access the data (e.g., to write or to read in another memory access request).

Accordingly, in the example, the key 228 may be provided to the non-volatile memory devices 210 with the received memory access request to be used for encryption of the written data. In such a case, the encrypted key 228 may be referred to as being associated with the data written to the memory address of the received memory access request. Accordingly, the memory controller 202 uses encryption logic 208 to generate encrypted keys 228 for the non-volatile memory devices 210.

In operation, the encryption logic 208 may generate a key 228 that is encrypted and used to access data stored on the non-volatile memory devices 210. The encryption logic 208 may receive the pseudorandom value 226 from the PRNG 222 and encrypt a key 228 based partly on the pseudorandom value 226 and a provisioned key. For example, the provisioned key may be a DEK stored in a register of the memory controller 202 or cache 214. The key 228 may be used by the memory controller 202 to authenticate access to the non-volatile memory devices 210. The encryption logic 208 may store the key 228 at the cache 214. For example, the cache 214 may include registers for data storage and the key 228 may be stored in a register of the cache 214. In such a case, the cache 214 may be referred to as being associated with the encryption logic 208. For example, the encryption logic 208 may be configured to provide the generated encrypted key 228 to the cache 214 for storage or a specific register of the cache 214 for storage. The cache 214 may be a RAM device, like a SRAM or DRAM storage device. In various implementations, the cache 214 may be a dynamic memory device, like a DRAM, and may interact with the processor 206. For example, the cache 214 may be a data cache that includes or corresponds to one or more cache levels of L1, L2, L3, L4 (e.g., as a multi-level cache), or any other cache level. In some implementations, the encryption logic 208 may also store the key 228 in a register (e.g., a data register) of the memory controller 202.

To generate the key 228 that is encrypted, the PRNG 22.2 may generate the pseudorandom value 226. In various implementations, the PRNG 222 may be a linear-feedback shift register (LFSR), such that an output of the PRNG 222 is a random value. For example, the LFSR may comprise a combination of one or more XOR logic units (also referred to as XOR logic gates) that receive feedback as input, such that the output of the combination of one or more XOR logic units is the pseudorandom value 226. Accordingly, as depicted in FIG. 2, a pseudorandom value 226 is provided to the encryption logic 208 to be used as an initialization vector (IV) in the encryption logic 208.

The memory controller 202 may utilize the pseudorandom value 226 as an initialization vector for an authenticated stream cipher to generate the encrypted key 228. Upon the processor 206 receiving the pseudorandom value 226, the processor may route the pseudorandom value 226 to the encryption logic 208, where encryption logic 208 may use the pseudorandom value 226 as an initialization vector (IV) for an authenticated stream cipher. For example, the authentication encryption logic 208 may include an AES-Galois-Counter Mode (AES-GCM) pipeline, such that the authentication encryption logic 208 generate a key 228 based on the authenticated stream cipher using the pseudorandom value 226 as the IV and/or a provisioned key (e.g., a DEK). For example, the GCM may generate an authentication tag for the encrypted key 228 using an underlying key (e.g., a DEK). Accordingly, in the context of a write operation in obtained received memory access request, the key 228 may be used to encrypt the data to be written as plaintext to ciphertext. While AES-GCM is described in some examples, it is to be understood that other authenticated stream ciphers may also be used in encryption logic 208 to generate encrypted keys, like key 228.

In the example of a received memory access request including a read command, the memory system 200, advantageously, also facilitates the retrieval of encrypted keys, like key 228, to read data on the non-volatile memory devices 210. For example, responsive to receiving a memory access request at processor 206, the processor 206 may provide an encryption indication (e.g., encryption signal) to the encryption logic 208. Responsive to the encryption indication, the encryption logic 208 may retrieve an encrypted key 228 for that particular memory access request based on a memory address in the received memory access request. For example, the encryption logic 208, upon receiving the encryption indication, may identify a memory address in the received memory access request that corresponds to a memory address of at least one of the non-volatile memory devices 210. Once identified, the encryption logic 208 may retrieve an encrypted key 228 for data associated with that memory access request. The key 228 may be used to securely retrieve data or read the data at the memory address of a particular non-volatile memory device of the non-volatile memory devices 210. The data to be read may be accessed only if the encrypted key 228 is used to access the data. For example, once the read data is retrieved from the non-volatile memory devices 210, the processor 206 may use the encryption logic 208 and the key 228 to decrypt the read data. As an example, the encryption logic 208 may apply a converse decryption algorithm to the encryption algorithm that was used to encrypt the key 228. In the implementation of an AES-GCM pipeline, the key 228 may be used to decrypt retrieved read data that is ciphertext as plaintext, in such a case, the encrypted key 228 may be referred to as being associated with the data to be read from the memory address of the received memory access request. Accordingly, the memory controller 202 uses encryption logic 208 to retrieve encrypted keys 228 for the non-volatile memory devices 210.

The host computing device 204 may be electrically connected to a power source 224, which may provide power to the host computing device 204 during operation. The memory controller 202 may also be powered by the power source 114, which may also provide power to the memory controller 202. When the power source 224 is electrically disconnected from the memory controller 202, the memory controller 202 may lose power, erasing the key 228 from the cache 214. Advantageously, in writing the key 228 in the cache 214, which may be a volatile memory device, the cache 214 erases data or loses data upon electrical disconnection from the power source 224, for example, as described with respect to FIG. 1, if a malicious actor were to physically remove (or steal) the one or more elements of the memory system 200 (e.g., the memory controller 202), in an attempt to acquire the PII data stored on the non-volatile memory devices 210, the encrypted key 228 to access the data stored on the non-volatile memory devices 210 would be erased from the cache 214 of the memory controller 202 when the memory controller 202 loses power. In the example, when the memory controller 202 is unplugged or electrically disconnected from the power source 224, the key 228 is erased from the cache 214; thereby making it difficult for the malicious actor to access the data stored on the non-volatile memory devices 210. For example, the malicious actor could not simply turn on the laptop to the access the data stored on the non-volatile memory devices 210 because the key 228 was erased from the cache 110. Therefore, advantageously, the system 200 provides security for data, like the example of PII data, stored on non-volatile memory devices 210 coupled to the memory controller 202.

As described with respect to FIG. 1, when the memory controller 202 is unplugged or electrically disconnected from the power source 224, the memory controller 202 loses power in accordance with a comparison of threshold operating voltage, e.g., to detect whether the memory controller 202 has lost power. For example, the memory controller 202 loses power when the memory controller 202 passes below a threshold operating voltage for the memory, controller 202. In an example of the memory controller 202 being implemented as part of a printed circuit board, if the threshold operating voltage is a 5V printed circuit board voltage, the memory controller 202 may lose power when the 5V voltage is no longer supplied to the memory controller 202 because the memory controller 202 uses the power source 224 to maintain that 5V printed circuit board voltage at the memory controller 202. Accordingly, the memory controller 202 loses power because the power supplied to the memory controller 202 passes below the 5V voltage, causing the key 228 to be erased from the cache 110.

Additionally or alternatively, in using a threshold operating voltage for the memory controller 202 to detect whether the memory controller 202 has lost power, the memory controller 202 may include a timer circuit (not depicted in FIG. 2). The timer circuit may receive a clock signal from the printed circuit board that is separately powered by a battery coupled to the printed circuit board. The timer circuit may be used by the memory controller 202 to measure an amount of time that has passed after the memory controller 202 has lost power. In some examples, the memory controller 202 may compare an amount of time that has passed since losing power, as measured by a timing circuit, with a threshold amount of time. If, based on the comparison of the amount of time and the threshold of time, the amount of time is less than the threshold amount of time, the memory controller 202 will not erase the key 228 is from the cache 110, e.g., the memory controller 202 will maintain a battery connection to the cache 110 (e.g., a battery coupled to the printed circuit board that the memory controller 202 is implemented upon), while the amount of time is measured by the timer circuit and the memory controller 202 performs the comparison.

The threshold amount of time may correspond to a power loss event, such as a power-line flicker, where power to the computing device 202 is lost for an amount of time less than the threshold amount of time. The threshold amount of time may be stored in a memory or a cache (e.g., cache 110). The threshold amount of time may be a parameter set by a user of the computing device 204 (and provided to the memory controller 202) or may be based on a flicker metric, such as a power flicker metric defined by the IEEE 1453 standard and/or IEC 61000-4-15. Accordingly, when the power source 224 is electrically disconnected from the memory controller 202, the memory controller 202 may use an amount of time, as measured by a timer circuit and a threshold operating voltage, to detect whether the memory controller 202 has lost power. If the amount of time measured passes the threshold amount of time and the operating voltage passes a threshold operating voltage, then memory controller 202 will have detected that a power source 224 has been disconnected, causing the key 228 to be erased from the cache 110. In examples where the memory controller 202 maintains a battery connection to the cache 110, the memory controller 202 will disconnect and/or decouple the battery connection to the cache 110, such that the cache 110 loses a power supply or operating voltage.

Additionally or alternatively, as described with respect to memory controller 104, memory controller 202 may be an NVDIMM memory controller, which is coupled to the host computing device 204 via the host bus 220. The host bus 220 may operate in accordance with an NVDIMM protocol, such as NVDIMM-F, NVDIMM-N, NVDIMM-P, or NVDIMM-X. For example, in such implementations, the non-volatile memory devices 210 may be NAND memory devices or 3D XPoint memory devices. Accordingly, in such implementations, the non-volatile memory devices 210 may operate as persistent storage for the cache 214, which may be a volatile memory device and/or operate as persistent storage for any volatile memory on the memory controller 202 or the host computing device 204. In various implementations, the memory controller 104 may be implemented using the memory controller 202, including any of the methods described here that may be performed in the memory controller 202.

FIG. 3 is a schematic illustration of a method in accordance with examples described herein. Example method 300 may be performed using, for example, processor 206 of FIG. 2 that executes executable instructions (e.g., stored in a memory, not necessarily shown) to interact with the non-volatile memory devices 210 via respective memory buses 218. In some examples, the method 300 may be wholly or partially implemented by encryption logic 208 of FIG. 2. For example, the operations described in blocks 302-308 may be stored as computer-executable instructions in a computer-readable medium accessible by processor 206. In an implementation, the computer-readable medium accessible by the processor 206 may be one of the non-volatile memory devices 210 or the cache 214. For example, the executable instructions may be stored on one of the non-volatile memory devices 210 and retrieved by a memory controller 202 for the processor 206 to execute the executable instructions for performing the method 300. Additionally or alternatively, the executable instructions may be stored on a memory coupled to the host computing device 204 and retrieved by the processor 206 to execute the executable instructions for performing the method 300.

Example method 300 may begin with block 302 that starts execution of the method 300. Block 302 includes receiving, from a host computing device, a memory access request for a memory device. The memory access request may be or include a command and a memory address. Accordingly, block 302 may include receiving, from a host computing device, a command and an address for one or more memory devices. In an example of memory access request including a write command, the host computing device 204 of FIG. 2 may provide a memory access request, including a memory address and data to be written, to the memory controller 202, e.g., to the host interface 212 via the host bus 220. For example, as described with respect to memory system 200, in the example of a received memory access request including a read command, the memory system 200, advantageously, the memory controller 202 facilitates the retrieval of encrypted keys to read data on the non-volatile memory devices 210. Accordingly, the processor 206 may receive the memory access request for generation or retrieval of an encrypted key for data access associated with the memory address request.

Block 302 may be followed by block 304. Block 304 includes, responsive to the memory access request, encrypting, at encryption logic, a key for data associated with the memory access request. For example, encryption logic 208 may identify a memory address in the received memory access request that corresponds to a memory address of a non-volatile memory device. Once identified, the encryption logic 208 may generate an encrypted key for data associated with that memory access request. In the example of the write operation, the encrypted key may be generated to secure the data written to the memory address at a non-volatile memory device. To encrypt the key, the encryption logic 208 uses an pseudorandom value as an IV for an authenticated stream cipher (e.g., an AES-GCM pipeline) and a provisioned key, like a DEK. The encryption logic 208 encrypts the provisioned key based at least on the pseudorandom value to associate the encrypted key with the memory access request and/or the memory address of the memory address request. Accordingly, in the context of a write operation in a received memory access request, an encrypted key may be used to encrypt the data to be written as plaintext to ciphertext. Advantageously, based on a received memory access request, data read or written by a host computing device to various non-volatile memory devices may be accessed in an authenticated manner, e.g., using the generated encrypted key.

Block 304 may be followed by block 306. In block 306, the method includes writing, to a cache of a memory controller, the encrypted key for the non-volatile memory device. In the example implementation, the processor 206 may write the generated encrypted key 228 to the cache 214, e.g., to access data stored on non-volatile memory devices 210 responsive to memory access requests from the host computing device 204. In an example, any data accessed, whether read or written, to a particular non-volatile memory device may use the generated encrypted key. Accordingly, the processor 206 writes the encrypted key 228 to the cache 214 for memory access requests at the particular non-volatile memory device. For example, the encryption logic 208 may store the output of the AES-GCM pipeline at a particular data register of the cache 214, which may be a volatile memory device. In the example, because the encrypted key 228 is stored in a volatile memory device of the memory controller 202—when the memory controller 202 loses electrical connection to a power source 224 or is powered down—the encrypted key 228 is erased. For example, the encrypted key 228 may be erased responsive to the powering down (e.g., a power down indication received, as described with respect to method 400), or by virtue of the volatile memory device having lost power. Accordingly, the data stored at the non-volatile memory device may not be accessed when the memory controller 202 (or a computing device implementing the memory controller 202) loses power.

Block 306 may be followed by block 308. In block 308, the method includes providing, to the non-volatile memory device, the encrypted key for accessing data associated with the memory access request. The encryption logic 208 uses the encrypted key 228 to authenticate memory commands based on the received memory access request. Advantageously, the encrypted key 228 may be generated to secure the data written to or read from the non-volatile memory device 210. In an example implementation, the processor 206 may authenticate a memory command to be issued from the memory controller 202 to a non-volatile memory device 210 using the encrypted key 228. For example, the encryption logic 208 may perform a memory access operation associated with the memory access request. In an example implementation, once the memory command is provided to a non-volatile memory device 210 with the encrypted key 228, the non-volatile memory device 210 may perform the memory, access operation based on the memory access request. For example, a read, write, activate, or refresh operation may be performed by the non-volatile memory device 210 interacting with the memory controller 202 to perform the memory access operation. Accordingly, block 308 may include performing a memory access operation associated with a command whether read, write, activate, or refresh. In an example, a read operation may include the non-volatile memory device 210 providing read data back to the memory controller 202. The method 300 may end after completion of the block 308.

The blocks included in the described example method 300 are for illustration purposes. In some embodiments, these blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

FIG. 4 is a schematic illustration of a method in accordance with examples described herein. Example method 400 may be performed using, for example, processor 206 of FIG. 2 that executes executable instructions to interact with the non-volatile memory devices 210 via respective memory buses 218. In some examples, the method 400 may be wholly or partially implemented by encryption logic 208 of FIG. 2. For example, the operations described in blocks 402-408 may be stored as computer-executable instructions in a computer-readable medium accessible by processor 206. In an implementation, the computer-readable medium accessible by the processor 206 may be one of the non-volatile memory devices 210 or the cache 214. For example, the executable instructions may be stored on one of the non-volatile memory devices 210 and retrieved by a memory controller 202 for the processor 206 to execute the executable instructions for performing the method 400. Additionally or alternatively, the executable instructions may be stored on a memory coupled to the host computing device 204 and retrieved by the processor 206 to execute the executable instructions for performing the method 400.

Example method 400 may begin with block 402 that starts execution of the method 400 and includes writing, to a cache, an encrypted key for at least one non-volatile memory device of a plurality of non-volatile memory devices. Block 402 may be performed in a manner as was described with respect to block 306 of FIG. 3. In some examples, the processor 206 may write the generated encrypted key 228 to the cache 214, e.g., for data access to non-volatile memory devices 210 responsive to memory access requests from the host computing device 204. Advantageously, because the encrypted key 228 is stored in a volatile memory device of the memory controller 202, when the memory controller 202 loses electrical connection to a power source 224 or is powered down, the encrypted key 228 is erased.

In some implementations of method 400, block 402 may be followed by block 404. In block 404, the method further includes receiving a power down indication for a volatile memory or memory controller powering the cache. In an example implementation described with respect to FIG. 2, processor 206 may receive a power down indication from the host computing device 204 that the memory controller 202 or a volatile memory device (e.g., the cache 214 or a cache 214 coupled to a volatile memory device) is to be powered down. For example, a data center operator may reset or disconnect power source 224 to provide an initial state or reset the host computing device 204 operating as a server, e.g., the host computing device 204 may be reset to provide security updates to the host computing device 204 or to facilitate access to the host computing device 204 for a new user (e.g., a customer of the data center) accessing the host computing device 204. Accordingly, a power down indication may be provided by the host computing device 204 to the processor 206 that the cache 214 or memory controller 202 is to be powered down, e.g., as part of a reset for the host computing device 204.

Block 404 may be followed by block 406. In block 406, the method further includes responsive to powering down the volatile device or memory controller, erasing the encrypted key for the at least one non-volatile memory device of the plurality of non-volatile memory devices. When the host computing device 204 is powered down or disconnected from a power source 224, the encrypted key 228 may be erased. For example, the encrypted key 228 may be erased responsive to the powering down (e.g., a power down indication received, as described with respect to method 400), or by virtue of the volatile memory device (e.g., the cache 214 or a cache 214 coupled to a volatile memory device) having lost power. In the example implementation following a power down indication at optional block 404, the host computing device 204 may reset the memory controller 202 and/or the cache 214, as part of a reset for the host computing device 204. The host computing device 204 may provide a power down indication to the processor 206 which erases the cache 214 when powering down the memory, controller 202. Continuing in the example, the host computing device 204 may disconnect an electrical connection of the host computing device 204 to the power source 224 and/or may disconnect an electrical connection of the memory controller 202 to the power source 224. In various implementations, the key 228 may be erased by virtue of a power down by the memory controller 202, e.g., if the memory controller 202 loses power or is electrically disconnected from the power source 224. For example, because the key is stored in the cache 214, which is coupled to a volatile memory device or is the volatile memory device, the key is erased when power is lost by virtue of having lost a power source to the memory cells of the volatile memory device, or cache 214. Advantageously, the data stored at the non-volatile memory device may not be accessed when the memory controller 202 (or a computing device implementing the memory controller 202) loses power or powers down. The method 400 may end after completion of the block 406.

The blocks included in the described example method 400 are for illustration purposes. In some embodiments, these blocks may be performed in a different order. In some other embodiments, various blocks may be eliminated. For example, as described, block 404 is an optional block, in that a power down indication may not be received when power is lost immediately upon electrical disconnection from a power source. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples," The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed b a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:

writing, to a cache coupled to a volatile memory device and a memory controller, an encrypted key to provide authenticated access to encrypted data stored at a plurality of non-volatile memory devices coupled to the volatile memory device and the memory controller, wherein the encrypted data is accessible at a host coupled to the plurality of non-volatile memory devices using the memory controller, wherein the encrypted key is specific to data associated with a memory address of a memory access request, and wherein the memory address of the memory access request corresponds to a memory address of at least one of the plurality of non-volatile memory devices;

detecting, by the memory controller a loss of power by comparing a received voltage to a threshold operating voltage;

determining, by the memory controller and using a timing circuit, that a duration of the loss of power exceeds a threshold amount of time; and responsive to the determination that the duration of the loss of power exceeds the threshold amount of time, erasing the stored encrypted key for the plurality of non-volatile memory devices.

2. The method of claim 1, further comprising:

receiving a power down indication for the volatile memory device that is electrically connected to at least one non-volatile memory device of the plurality of non-volatile memory devices.

3. The method of claim 2, wherein the volatile memory device that is electrically connected to the at least one non-volatile memory device is powered by a computing device electrically connected to a power source.

4. The method of claim 3, wherein the computing device electrically connected to the power source is the memory controller.

5. The method of claim 1, wherein the plurality of non-volatile memory devices comprise at least one of a NAND memory device or a 3D XPoint memory device.

6. The method of claim 1, further comprising:

receiving a pseudorandom value from a pseudorandom number generator;

encrypting a key for at least one non-volatile memory device of the plurality of non-volatile memory devices based partly on the pseudorandom value; and providing the encrypted key for the at least one non-volatile memory device to the at least one non-volatile memory device.

7. The method of claim 6, wherein encrypting the key for the at least one non-volatile memory device based partly on the pseudorandom value comprises using an authenticated stream cipher to generate the key.

8. The method of claim 7, wherein the authenticated stream cipher comprises an advanced encryption standard (AES) cipher that uses the pseudorandom value as an initialization vector.

9. The method of claim 1, wherein the threshold amount of time is set by a user, or wherein the threshold amount of time is based on a flicker metric.

10. The method of claim 1, wherein erasing the stored encrypted key includes terminating, by the memory controller, a connection between the cache and a power supply.

11. A method comprising:

receiving, from a host computing device coupled to a plurality of non-volatile memory devices, a memory access request for a non-volatile memory device of the plurality of non-volatile memory devices;

responsive to the memory access request, encrypting, at encryption logic comprising an advanced encryption standard (AES) cipher, a key for data associated with the memory access request, wherein the key is to provide authenticated access, by the host computing device, to encrypted data stored at the plurality of non-volatile memory devices, wherein the encrypted key is specific to data associated with a memory address of the memory access request, and wherein the memory address of the memory access request corresponds to a memory address of at least one of the plurality of non-volatile memory devices;

writing, to a cache of a memory controller, the key for the plurality of non-volatile memory devices;

providing, to at least one non-volatile memory device, the key for accessing, by the host computing device, data associated with the memory access request;

detecting, by the memory controller, a loss of power by comparing a received voltage to a threshold operating voltage;

determining, by the memory controller and using a timing circuit, that a duration of the loss of power exceeds a threshold amount of time; and erasing, by the memory controller, the key when the duration of the loss of power exceeds the threshold amount of time.

12. The method of claim 11, further comprising:

powering down the memory controller.

13. The method of claim 11, further comprising:

receiving a power down indication for the memory controller; and disconnecting an electrical connection to the memory controller.

14. The method of claim 13, wherein the host computing device comprises the memory controller, and wherein disconnecting the electrical connection to the memory controller comprises disconnecting an electrical connection of host computing device.

15. The method of claim 11, wherein writing, to the cache of a memory controller, the key for the at least one non-volatile memory device comprises configuring the cache of the memory controller to be associated with the AES cipher.

16. The method of claim 11, further comprising:

providing/retrieving, to/from the at least one non-volatile memory device, the data associated with the memory access request using the key.

17. The method of claim 16, when retrieving from the at least one non-volatile memory device the data associated with the memory access request, the method further comprising:

decrypting the data associated with the memory request using the key.

18. An apparatus comprising:

encryption logic configured to encrypt a key configured to provide authenticated access, by a host, to encrypted data stored at a plurality of non-volatile memory devices coupled to the host, wherein the encrypted key is specific to data associated with a memory address of a memory access request and wherein the memory address of the memory access request corresponds to a memory address of at least one of the plurality of non-volatile memory devices;

a cache of a volatile memory configured to store the key;

a memory bus coupled to the plurality of non-volatile memory devices, the encryption logic further configured to provide, via the memory bus, the key to at least one non-volatile memory device of the plurality of non-volatile memory devices coupled to the host; and a memory controller configured to detect a loss of power by comparing a received voltage to a threshold operating voltage and to erase the key from the cache when a duration of the loss of power exceeds a threshold amount of time.

19. The apparatus of claim 18, wherein the at least one non-volatile memory device comprises a NAND memory device and the memory bus comprises an NVDIMM bus.

20. The apparatus of claim 18, wherein the encryption logic is further configured to receive the memory access request from the host via a PCIe bus and to provide the key with the memory access request.

21. The apparatus of claim 20, wherein to provide the memory access request with the key, the encryption logic is further configured to identify the memory address, in the memory access request, that corresponds to the memory address of the at least one non-volatile memory device.

22. The apparatus of claim 18, wherein the memory controller is coupled to the at least one non-volatile memory device via an NVDIMM bus.

23. The apparatus of claim 18, wherein the cache comprises a register configured to store the key.

24. The method of claim 1, wherein the host is separate from the plurality of non-volatile memory devices, and wherein the cache is included in the memory controller.

25. The apparatus of claim 18, wherein the encryption logic comprises an advanced encryption standard (AES) cipher.

*   *   *   *   *